Feb. 17, 1959         M. J. DE DONA         2,873,470
                      HINGE AND HOLD-OPEN
Filed June 20, 1956                         2 Sheets-Sheet 2

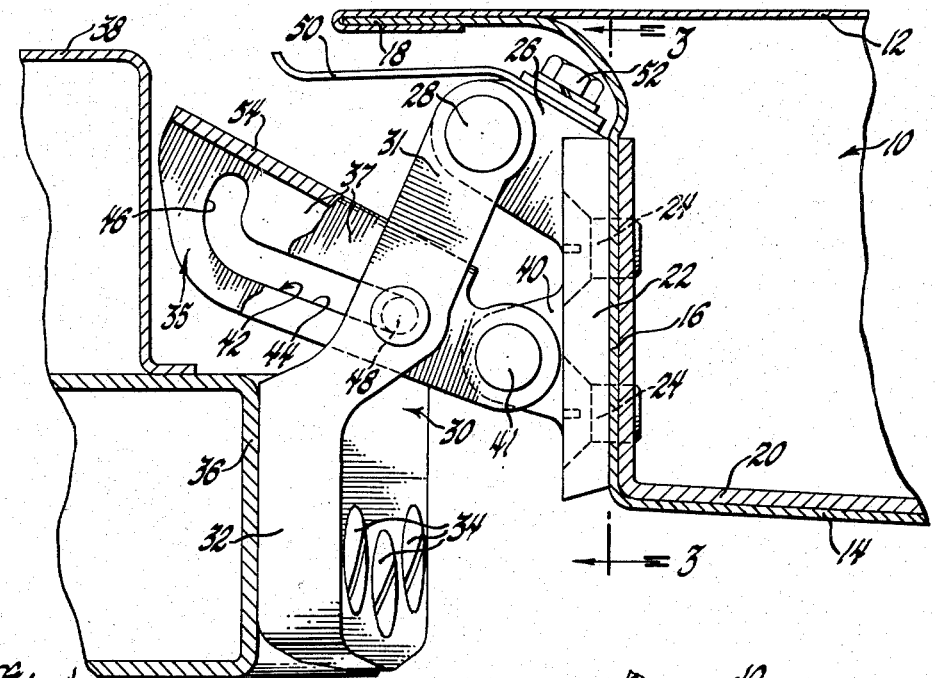
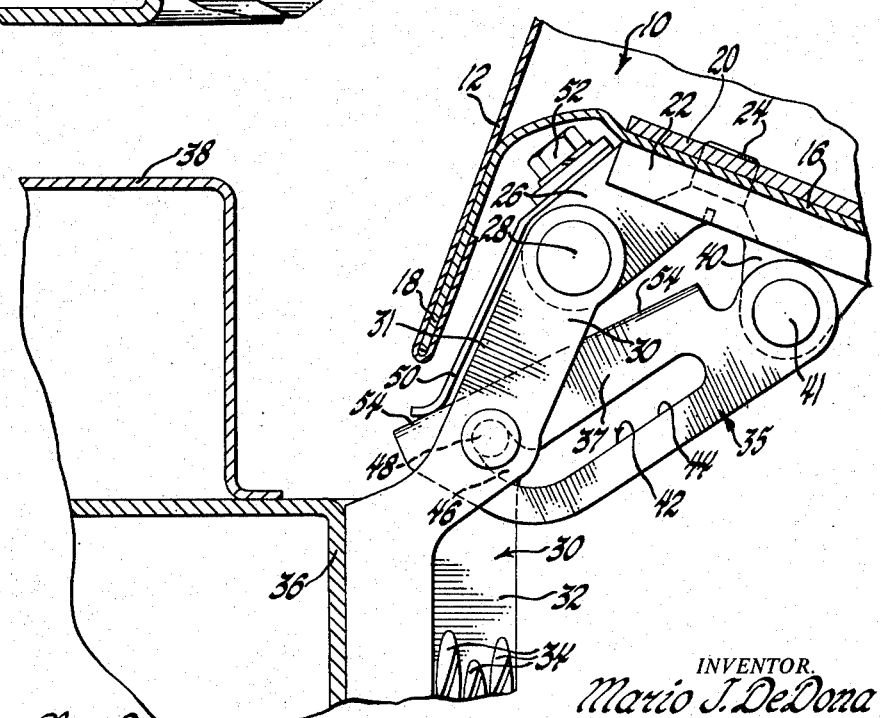

INVENTOR.
Mario J. De Dona
BY
Paul Fitzpatrick
ATTORNEY.

United States Patent Office 2,873,470
Patented Feb. 17, 1959

2,873,470

HINGE AND HOLD-OPEN

Mario J. De Dona, Lincoln Park, Mich., assignor to General Motors Corporation, Detroit, Mich., a corporation of Delaware Application June 20, 1956, Serial No. 592,605

2 Claims. (Cl. 16—146)

This invention relates to a hinge and hold open assembly, and more particularly to a unitary hinge and hold open for an automobile door.

One feature of the invention is that it provides an improved hinge and hold open assembly.

Another feature of the invention is that it provides a hinge combined with a yieldable hold open of simple yet rugged and dependable construction; a further feature of the invention is that it provides a hinge and hold open including a pair of hinge straps one of which has an opening therein and the other of which carries a hold open link which projects through the opening in the first strap and is connected thereto by a pin and slot arrangement including detent means operable to yieldably hold the door in open position; still another feature of the invention is that the link is formed with a slot having a curved end providing detent means, a pin on the hinge strap engaging said detent means when the door is open; and still a further feature of the invention is that there is a spring which bears against the link when the door is open to yieldably hold the pin against the detent, the spring being out of engagement with the link when the door is closed to permit unrestrained movement of the pin in the slot.

Other features and advantages of the invention will be apparent from the following description and from the drawings, in which:

Fig. 1 is a horizontal sectional view through a portion of an automobile body and door showing the improved hinge and hold open in top plan view, the door being closed.

Fig. 2 is a view similar to Fig. 1 but with the door open; and

Figure 3:
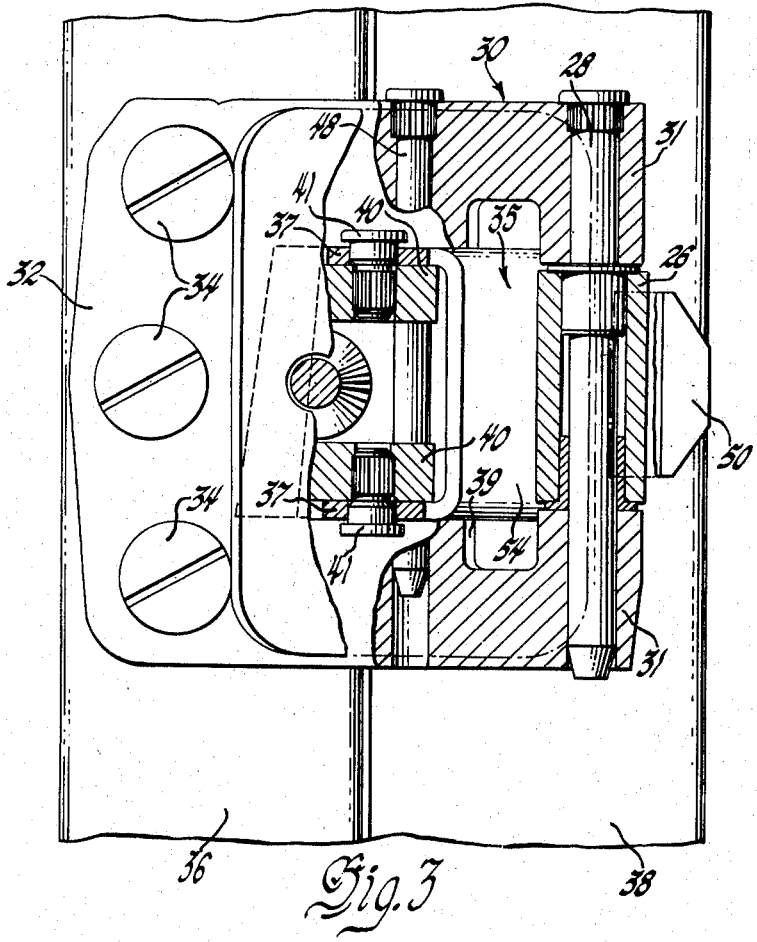
Figure 3 is a vertical section taken along the line 3—3 of Fig. 1.

Referring now more particularly to the drawings, an automobile door designated generally as 10 has an outer panel 12 and an inner panel 14 spaced from and generally parallel to the outer panel. The end portion 16 of the door inner panel is bent at right angles to form the jamb face of the door and the terminal edge of the end portion is bent to lie against the inner surface of the outer panel 12, the panels being secured together at 18 by a conventional pinch weld flange. The inner panel is strengthened by an L-shaped reinforcing member 20.

A first hinge strap 22 is secured by screws 24 to the jamb face 16 of the inner door panel. Adjacent its outer end the strap has an upstanding ear 26 upon which is pivotally mounted by a pin 28 the free end of a second hinge strap 30 which is formed as a yoke, having arms 31 straddling the ear 26. The butt end 32 of the strap is secured by screws 34 to a body pillar member 36 forming part of an automobile body 38. An elongated opening 39 is formed in this strap 30.

A hold open link 35, which is channel-shaped in transverse section, has a base 54 and opposite walls 37. The link is mounted by pins 41 on spaced ears 40 projecting from the first strap 22. The hold open link has in its opposite side wall aligned J-shaped slots each of which is designated generally as 42 and each having a straight stem portion 44 terminating in a closed end and a curved terminal portion 46 which also terminates in a closed end. The link 35 projects through the opening 39 and a pin 48 which is mounted on the second hinge strap 30 extends through the opposite slots 42. As seen in Fig. 1, when the door is closed, the pin is located adjacent the closed end of the straight stem portion 44 of the slots. As seen in Figure 2 when the door is open, the pin is located in the curved portion 46 and adjacent the closed end thereof, this latter closed end providing a limit stop for opening movement of the door.

The curved terminal portion of the slots provides a detent and a leaf spring 50, which is mounted by a bolt 52 on the ear 26, is so arranged that it is out of engagement with the link when the door is closed as shown in Figure 1 to permit unrestrained movement of the pin 48 in the slot 44 without any binding forces being exerted on the link. However, as the door swings toward its fully open position, the spring approaches the base surface 54 of the channel-shaped link and shortly before the door reaches its open position, the spring bears against the link, being deflected as the door moves to its fully open position and exerting a force to yieldably hold pin 48 in the curved terminal portion 46 of the slot to provide a yieldable hold-open. When the door is swung closed, the link 35 pivots against the force of the spring, being cammed by the pin 48 until the pin rides in the straight stem portion of the slot. As the door moves further closed, the link moves out of engagement with the spring so that there is no binding force acting on the link to impede movement of the pin 48 in the slot 42 during a considerable portion of the movement of the door.

While I have shown and described one embodiment of my invention, it is capable of many modifications. Changes, therefore, in the construction and arrangement may be made without departing from the spirit and scope of the invention as set forth in the appended claims.

I claim:

1. A hinge and hold-open assembly comprising, in combination, a first hinge strap connected to a door; a second hinge strap connected to a body member, one of said straps having an opening therethrough; means pivotally connecting said straps together at one end to permit swinging said door between opened and closed positions; a link pivotally connected to the other of said straps at a point spaced from the pivotal connection between said straps and extending at an angle to said one strap through the opening therein, said link having an elongated slot with a straight stem portion extending longitudinally of the link, an intermediate curved portion, and a short terminal portion merging from said curved portion adjacent the end of the link remote from the pivotal mounting thereof, said terminal portion extending at substantially a right angle to the stem portion in the general direction of the pivotal interconnection of said straps; a pin on said one strap projecting into the slot in said link and being located in the straight stem portion of said slot when the door is closed and in the terminal portion of the slot when the door is open; and a leaf spring mounted on said other strap adjacent the pivotal connection between said straps and extending at an acute angle to said one strap when the door is closed, said spring having a free end which is adapted to bear against said link when the door is in open position to yieldably urge the terminal end portion of the slot into engagement with the pin, the free end of the spring being out of engagement with the link when the door is closed to permit unrestrained movement of the pin in the slot.

2. A hinge and hold-open assembly comprising, in combination, a first hinge strap connected to a door; a second hinge strap connected to a body member, said second strap having an opening therethrough; means pivotally connecting said straps together at one end to permit swinging said door between open and closed positions; a link pivotally connected to the first strap at a point spaced from the pivotal connection between said straps and extending at an angle to said second strap through the opening therein, said link having an elongated slot with a straight stem portion extending longitudinally of the link, an intermediate curved portion located remote from the pivotal connection of the link, and a short terminal portion merging from said curved portion adjacent the end of the link remote from the pivotal mounting thereof, said terminal portion extending at substantially a right angle to the stem portion in the general direction of the pivotal interconnection of said straps; a pin on said second strap projecting into the slot in said link and being located in the straight stem portion of said slot close to the pivotal connection of the link when the door is closed and in the terminal portion of the slot when the door is open; and a leaf spring mounted on said first strap adjacent the pivotal connection between said straps and extending at an acute angle to said second strap when the door is closed, said spring having a free end which is adapted to bear against said link at a location adjacent the terminal portion of the slot when the door is in open position to yieldably urge the terminal end portion of the slot into engagement with the pin, the free end of the spring being out of engagement with the link when the door is closed to permit unrestrained movement of the pin in the slot.

References Cited in the file of this patent

UNITED STATES PATENTS

| | | |
|---|---|---|
| 188,414 | Rohde | Mar. 13, 1877 |
| 1,406,468 | McCollum | Feb. 14, 1922 |
| 1,776,198 | Russ et al. | Sept. 16, 1930 |
| 2,722,035 | Johnson | Nov. 1, 1955 |